Patented Mar. 12, 1946

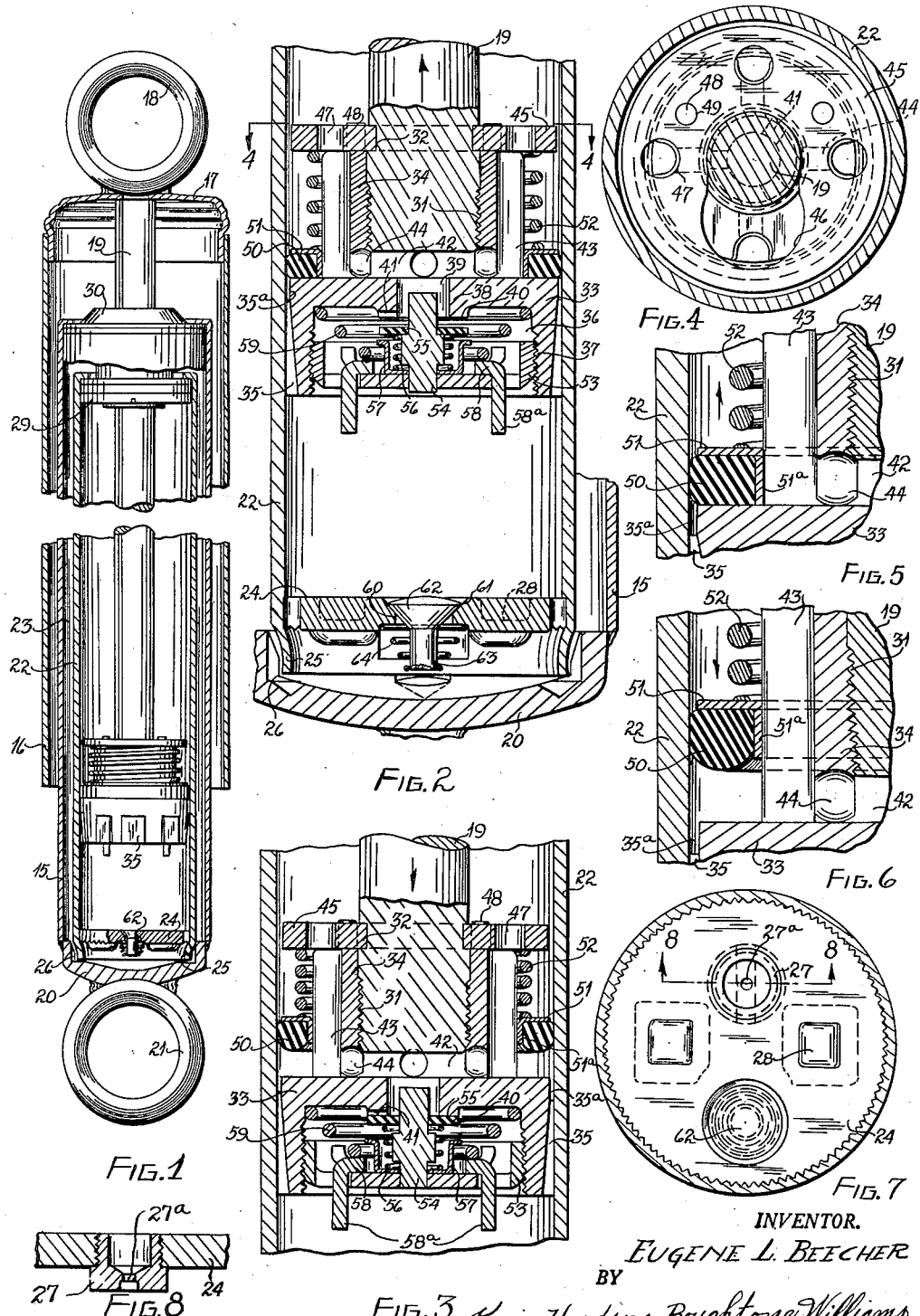

2,396,227

UNITED STATES PATENT OFFICE 2,396,227

SHOCK ABSORBER

Eugene L. Beecher, Cleveland Heights, Ohio, assignor to The Gabriel Company, Cleveland, Ohio, a corporation of Ohio Application January 9, 1945, Serial No. 572,065

5 Claims. (Cl. 188—88)

This invention relates to a shock absorber and particularly to a fluid shock absorber. Although the invention is applicable to various types of fluid shock absorbers it is illustrated and explained herein by way of example as embodied in a direct double acting hydraulic shock absorber.

This invention in certain of its aspects is an improvement on the invention disclosed in my copending application, Serial Number 550,505, filed August 22, 1944. In my said copending application Serial No. 550,505 the piston is provided with a shiftable ring that performs the dual function of a piston packing ring and a valve, and in one embodiment disclosed in said copending application this ring is mounted on a carrier which has sliding movement on and axially of the piston.

An object of the present invention is to provide in connection with the last mentioned embodiment of my said copending application and improved relationship between the ring, the sliding carrier and the piston such that the degree of squeezing or distorting force exerted on the ring both radially and axially of the piston when the ring is in valve closing position can be controlled, i. e., the squeeze or distortion in both directions can be substantially equal or the squeeze in one direction can be greater than the squeeze in the other direction, depending upon what is desired.

Another object is to provide in a piston of a shock absorber a ring and carrier assembly, as referred to, and wherein different strength springs can be used for urging the carrier and ring into valve seated position without affecting the desired and predetermined degree of squeeze of the ring in a direction axially of the piston.

Another object is to provide in a shock absorber employing on the piston thereof a shiftable ring which performs the dual function of a piston packing and a valve and wherein said ring when in valve seated position does not have fluid pressure acting against its inner diameter.

A further object is to provide in a fluid shock absorber, an improved valve mechanism which is shown as a replenishing valve and which is self-centering, provides greater flow area for a given size than the usual conventional poppet type valve, and can have increased travel in a restricted space due to the absence of a guide stem.

A further object is to provide in a fluid shock absorber an improved valve mechanism which is silent in operation because said mechanism has a relatively large seating area with a resultant cushioning of the valve in its closing or seating movement.

A still further object is to provide in a fluid shock absorber an improved valve mechanism wherein the valve is self-centering and does not require a guide stem and, therefore, avoids the necessity of providing concentricity between the guide and the valvet seat.

Another object is to provide an improved and novel fluid shock absorber construction combining the features above enumerated.

Further and additional objects and advantages not hereinbefore referred to will become apparent hereinafter during the detailed description which is to follow.

Referring to the accompanying drawing illustrating an embodiment of the invention, Fig. 1 is a longitudinal sectional view through a direct acting hydraulic shock absorber with certain of the parts, including the piston and piston rod, shown in elevation.

Figs. 2 and 3 are fragmentary sectional views on a larger scale than Fig. 1 through the working cylinder of the shock absorber shown in Fig. 1; Fig. 2 showing the relationship of the parts during the recoil stroke of the shock absorber (the up stroke of the piston) while Fig. 3 shows the relationship of the parts during the impact or compression stroke of the shock absorber (the down stroke of the piston).

Fig. 4 is a transverse sectional view taken substantially along line 4—4 of Fig. 2 looking in the direction of the arrows.

Fig. 5 is a fragmentary sectional view corresponding to a portion of Fig. 2 but on a larger scale.

Fig. 6 is a fragmentary sectional view of a portion of Fig. 3 but on a larger scale.

Fig. 7 is a plan view of the closure member at the lower end of the working cylinder and which member is provided with the replenishing valve and the filler plug that has a fixed orifice therein, and Fig. 8 is a fragmentary sectional view taken substantially on line 8—8 of Fig. 7 looking in the direction of the arrows.

A shock absorber embodying the present invention is illustrated in the drawing and is, by way of example, a direct double acting hydraulic shock absorber. This shock absorber comprises a substantially cylindrical casing 15 which has relative telescoping movement within a cylindrical guard housing 16 that is spaced radially outwardly from the casing 15. The upper end of the housing 16 is closed by an inverted cup-shaped closure or cap member 17 provided on its outer side with an eye 18 while the piston rod 19 is operatively connected to the member 17 and eye 18. The lower end of the casing 15 is closed by a cup-shaped closure member 20 which has secured to its outer side a lower eye 21. The closure members 17 and 20 extend into the housing 16 and the casing 15, respectively, and are secured thereto by welding or by other suitable means.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 18 and 21. These pins or rods may be operatively connected with the eyes 18 and 21 by suitable means, well known in the art, wherefore relative movement between the frame and axle of the vehicle will cause relative telescoping movement between the casing 15 and the housing 16 and relative movement of the piston rod 19 and the piston secured thereto in the pressure or working cylinder as will be well understood.

The pressure or working cylinder 22 of the shock absorber is disposed within the casing 15 in spaced concentric relationship therewith so that the space defined by the casing 15, cylinder 22, closure member 20 and a closure member for the upper end of the casing and cylinder (later to be referred to) constitutes a reservoir 23 for the oil or liquid or fluid in the shock absorber.

The lower end of the cylinder 22 extends into the cup-shaped closure member 20 and is secured thereto by suitable means understood in the art.

The cylinder 22 slightly upwardly of the lower end has secured therein a closure plate 24. The cylinder 22 below the closure plate 24 is provided with an inwardly extending bead 25 which serves to retain the closure plate in position, while the cup-shaped closure member 20 is provided with a plurality of circumferentially spaced internal grooves or channels 26 which place the reservoir 23 in communication with the space between the closure plate 24 and the bottom of the cup-shaped closure member 20. The closure plate 24 is provided with a threaded removable filler plug 27 which has a fixed centrally disposed orifice 27a (see Figs. 7 and 8) and also is provided with circularly spaced inwardly facing depressions 28 for a purpose later to be referred to. In addition the closure plate 24 mounts a replenishing valve later to be referred to.

The upper or high pressure end of the cylinder 22 is closed by a plug member 29 which fits into the cylinder and is suitably secured in position therein, it being noted that the upper edge of the cylinder is turned inwardly over the outer side of the plug member. The plug member 29 is provided with a central opening through which slidably extends the piston rod 19. The construction of the plug member 29 forms no part of the present invention and therefore further description of the same is unnecessary except to say that it tightly seals the upper end of the cylinder 22. The upper end of the casing 15 is closed by a closure member 30 mounted in the casing and suitably connected thereto. The closure member 30 forms no part of the present invention and a detailed description thereof is unnecessary except to say that said member carries a suitable spring pressed packing seal through which the piston rod 19 slidably extends.

The piston rod 19 at its inner end is externally threaded as indicated at 31, see Figs. 2, 3, 5 and 6, while just above the threads 31 the piston rod is provided with an annular recess or groove 32. The piston comprises a body which may be formed in various ways but preferably it is a die casting. The piston body includes a lower and larger portion 33 and an upper and reduced portion 34. The periphery of the lower portion 33 of the piston body is provided with a plurality of circularly spaced axially extending grooves or passages 35 and said grooves or passages are deeper at their lower ends than they are at their upper ends for the purpose of decreasing the resistance of the by-pass flow of fluid through the grooves during the impact or compression stroke of the piston. The portion 33 above the grooves 35 is of less diameter than the internal diameter of the cylinder 22, wherefore an annular space 35a is provided between the cylinder and the periphery of the upper end of the piston portion 33.

In the present illustration eight of the grooves 35 are shown, but it should be understood that the number of these grooves or passages may be varied.

The lower portion 33 of the piston body is provided with a counterbore 36, the wall of which is threaded as indicated at 37 for a purpose later to be explained. The inner end of the counterbore 36, that is the upper end of the portion 33 of the piston body, is separated from the upper reduced or smaller piston portion 34 by a wall 38 in the center of which is a bore 39 communicating with the counterbore 36 and with a larger central bore 42 in the upper portion 34 of the piston body. The wall 38 surrounding the bore 39 is provided with an annular impact valve seat boss 40 projecting into the counterbore 36 and provided with three radially extending grooves or notches 41 angularly spaced circularly of the seat boss 40 and for a purpose later to be explained.

The upper part 34 of the piston body is provided with the previously referred to central bore 42 which is threaded so that the threaded end 31 of the piston rod 19 can be screwed into the bore 42 in uniting the piston body to the piston rod. The upper portion 34 of the piston body is also provided radially outwardly of the bore 42 with a plurality of circularly spaced axially extending peripheral recesses or grooves 43 which extend from the piston part 33 to the end of the piston part 34. The recesses 43 are substantially semicircular in cross-section and are angularly spaced circumferentially of the piston portion 34, there being four of such recesses illustrated herein. The recesses 43 can be die cast or otherwise formed in the piston body. The piston portion 34 is provided with ports 44 that place the lower end of the bore 42 into communication with the recesses 43.

A spring abutment plate or washer 45 is provided with an opening 46 similar to a bayonet slot, wherefore the piston rod 19 can be passed through the enlarged part of said opening 46 and then the washer 45 can be moved transversely relative to the piston rod to bring said rod into the smaller part of the slot 46 with the edge of said smaller part engaging in the annular groove 32 of the piston rod and with the washer 45 engaging the end of the piston part 34 with said washer forming an assembly abutment for the piston body.

The large part of the bayonet slot 46 in the washer 45 overlies one of the recesses 43 and the washer is provided with a plurality of openings 47 which overlie the remaining recesses 43 in the upper portion 34 of the piston body. The upper portion 34 of the piston body is provided with one or more axially extending lugs 48 which when the parts are assembled engage in openings 49 in the washer 45, see Figs. 2 and 4, and act to hold said washer against rotation relative to the piston body. The washer 45 is of less diameter than the internal diameter of the working cylinder 22, wherefore an annular space is provided between the circumference of said washer and the wall of the cylinder.

A flexible packing and valve ring 50 of normally circular cross-section and formed of any suitable material, such as synthetic rubber for example, is mounted on a carrier 51 which is slidable on the upper portion 34 of the piston body. The carrier 51 is in the form of a ring of angular cross-section having an arm 51a that extends longitudinally or axially of the piston and which contacts the piston portion 34 and slides therealong and a radially extending arm which overlies the upper side of the ring 50 as viewed in the drawing. It will thus be seen that the ring 50 moves with the carrier 51 toward and away from the piston portion 33 upon changes in direction of piston movement and that when the ring 50 is in the position shown in Fig. 2 it acts as a valve to close the space 35a and the passages or grooves 35, while in the position indicated in Fig. 3 said space and passages are open and are in communication with the passages 43 and the ring is functioning merely as a packing for the piston. A coil spring 52 is mounted on the piston portion 34 and abuts the washer 45 and the carrier 51 and exerts pressure on the carrier toward the portion 33 of the piston body.

The arm 51a of the carrier has its length determined so that when the ring 50 is in valve closed position, as indicated in Figs. 2 and 5, the free end of the arm 51a positively abuts the piston portion 33 and the carrier cannot move farther toward the portion 33, consequently the distorting or squeezing force of the carrier 51 on the ring 50 in a direction axially of the piston and when the ring 50 is in the position shown in Fig. 2 can be predetermined so as to be equal to or greater or less than the pressure or squeezing action on the ring 50 in a radial direction. For example, should the pressure or squeeze on the ring 50 in a radial direction be a predetermined amount the arm 51a can be so proportioned as to obtain the same or a greater or less pressure or squeeze on the ring 50 in an axial direction when the ring 50 is seated against the piston portion 33. Since the spring 52 seats the carrier against the piston portion 33 different strength springs may be used without affecting the desired and predetermined pressure or squeeze on the ring 50 in the axial direction, since the space in said direction between the piston portion 33 and the radially extending arm of the carrier is always the same when the arm 51 of the carrier is contacting the piston portion 33. The arrangement just described frees the ring 50 of excessive load as it removes fluid pressure against the inner diameter of the ring 50 during the recoil stroke of the piston, since said inner diameter of the ring 50 is covered by the carrier arm 51a.

Referring to Fig. 6, it will be noted that the ring 50 during the impact or compression stroke, i. e., the down stroke, has any substantial pressure or squeeze in an axial direction removed therefrom and at such time the ring extends below the free end of the arm 51a of the carrier. However, when the direction of the piston movement is reversed and the piston is traveling in its recoil stroke, i. e., an up direction, the spring 52 and the fluid pressure on the carrier and ring move the ring 50 toward the piston portion 33 until the ring contacts said piston portion with the desired predetermined axial pressure or squeeze, at which time the free end of the arm 51a of the carrier positively engages the piston portion 33; in other words, there is a sequential engagement of the portion 33 by the ring and carrier as the ring 50 engages the piston portion 33 during the recoil stroke before the carrier engages said portion and cushions the latter part of the movement of the carrier toward the piston portion 33, thus obviating objectionable clicking noises which would occur should the carrier engage the piston portion 33 without the cushioning action of the ring 50.

A cup-shaped member 53 is screwed into the counterbore 36 in the lower portion 33 of the piston body and said member has secured rigidly and centrally thereof a stud 54 which projects upwardly into the bore 39. A flat disk recoil valve 55 is slidable on the stud 54 and said valve is held normally against the valve seat boss 40 by a coil spring 56 mounted on the stud 54 and contained within a small cup-shaped member 57 also mounted on the stud 54 and bearing against the bottom of the cup-shaped member 53. The construction of the disk valve 55 and the stud 54 and the valve seat 40 forms no part of the present invention and need not be referred to in greater detail herein.

A member 58 is mounted within the cup-shaped member 53 and is held against said cup-shaped member by a heavy coil spring 59 which also acts to lock the cup-shaped member 53 in adjusted position. The member 58 has projections 58a which extend through openings in the cup-shaped member 53 and are adapted to cooperate with the recesses 28 of the closure plate 24 when the shock absorber is collapsed and the piston and cylinder relatively turned to effect an adjusting screwing in or out of the cup-shaped member 53 to vary the tension of the spring 56 and the action of the recoil valve 55.

As previously stated, the closure plate 24 is provided with a replenishing valve that opens during the recoil stroke of the piston to allow an increased volume of fluid to flow into the lower end of the working cylinder from the reservoir 23. It has also been stated that the closure plate 24 is provided with a fixed orifice 27a in the filler plug 27, wherefore a limited predetermined volume of fluid will flow through said orifice 27a to and from the reservoir during piston movement in both the impact and recoil strokes as will be well understood in the art.

The closure plate 24 is provided with an opening therethrough and which has a cylindrical portion 60 and a tapered or conical portion 61. The replenishing valve comprises a conical head 62 which when the valve is seated seats against the conical portion 61 of the opening in the closure plate. A short pin or stud 63 extends from the small end of the valve head 62 while a tapered coil spring 64 surrounds said stud 63 and a portion of the valve head 62 when said head is seated with the larger end of the spring abutting the closure plate 24 while the smaller end thereof is contracted about the end of the stud 63.

It will be noted that the stud 63 does not require a positive guide for it when the valve moves from closed to open position, since the conical valve spring 64 and the conical portion 61 of the opening together with the conical valve head 62 renders the valve self-centering and self-seating and in this respect the valve differs from the usual poppet type valve. It will also be noted that due to the conical configuration of the valve seat and the valve head a slight unseating of the head provides a relatively large flow area and also that said flow area is proportionately large for the size of the valve. Due to the self-centering of the valve it is not necessary to provide accurate concentricity between any guide stem for the valve and the valve seat as is required in the usual poppet type valves. Also the large seating area afforded for the conical valve head 62 by the conical portion 61 of the opening provides a cushioning effect for the valve head when it is moving to closed position with a resultant silent operation of the valve.

It is not believed necessary to specifically describe a cycle of operation of the shock absorber disclosed herein, since the manner in which the ring 50, recoil valve 55 and replenishing valve 62 function will be well understood by those skilled in the art. It should suffice to say that on the recoil stroke of the piston, Figs. 2 and 5, the ring 50 closes the passages 35 in the piston body, while the recoil valve 55 unseats as soon as the fluid pressure reaches a predetermined amount related to the strength of the spring 56. Also during the recoil stroke the replenishing valve 62 may open to rapidly replenish the fluid in the working cylinder below the piston. During the impact stroke of the piston, Figs. 3 and 6, the ring 50 moves away from the piston portion 33 and opens the passages 35 in the piston body, while the recoil valve 55 and the replenishing valve 62 are seated.

Although a preferred embodiment of the invention has been illustrated and described herein it will be understood that the invention is susceptible of various modifications and adaptations within the scope of the appended claims.

Having thus described my invention, I claim:

1. In a fluid shock absorber, a cylinder, a piston movable therein in opposite directions during the impact and recoil strokes, a passage extending from end to end of said piston, a packing element mounted by said piston, and a carrier for said element and shiftable relative to said piston during the recoil stroke to move said element into a position to close said passage and during the impact stroke to a position wherein said passage is open, said piston and carrier having cooperating portions which during the recoil stroke positively limit shifting movement of said carrier, wherefore a predetermined pressure is exerted on said element when in passage closing position during the recoil stroke.

2. In a fluid shock absorber, a cylinder, a piston movable therein in opposite directions during the impact and recoil strokes, a passage extending from end to end of said piston, a packing element mounted by said piston, a carrier for said element and shiftable relative to said piston during the recoil stroke to move said element into a position to close said passage and during the impact stroke to a position to open said passage, and spring means urging shifting movement of the carrier during the recoil stroke and resisting the same during the impact stroke, said piston and carrier having cooperating portions which during the recoil stroke positively limit shifting movement of said carrier, wherefore a predetermined pressure is exerted on said element when in passage closing position during the recoil stroke regardless of the strength of said spring means.

3. In a fluid shock absorber, a cylinder, a piston movable therein in opposite directions during the impact and recoil strokes, a passage extending from end to end of said piston, a seat on said piston and forming a portion of the wall of said passage, a packing element mounted by said piston, and a carrier for said element and shiftable relative to said piston during the recoil stroke to positively engage said seat and also to move said element into contact with said seat to close said passage and during the impact stroke to shift to a position wherein the carrier and element are both free of said seat and said passage is open, said element and carrier being so proportioned as to engage said seat sequentially in the order named, wherefore said element cushions the seat engagement by the carrier while said carrier determines the pressure applied to the element when seated.

4. In a fluid shock absorber, a cylinder, a piston reciprocable therein and having a portion of reduced diameter providing an annular space between it and said cylinder, passages extending from the opposite ends of said piston and communicating with said space, an annular carrier having a radially extending arm and an axially extending arm slidable on said piston portion, spring means acting on said radially extending arm to abut the free end of the axially extending arm with said piston, a flexible packing ring mounted on said carrier and contacting the arms thereof and the cylinder and when said free end of the axial arm abuts the piston interrupting communication between said passages, said ring having a normally circular cross-section of a diameter greater than the length of said axial arm and greater than the distance between the latter and the cylinder wall, said axial arm of said carrier being of predetermined selected length in relation to said distance to cause the axial distortion of said ring in passage closing position to have a predetermined fixed relationship to the radial distortion thereof.

5. In a fluid shock absorber, a cylinder, a piston reciprocable therein and including a reduced portion and a larger portion slidable in said cylinder, said reduced portion having passages extending from end to end thereof and communicating with the space between said reduced portion and the cylinder and adjacent the larger piston portion, said larger piston portion having passages extending from end to end thereof and communicating with said space, an annular carrier surrounding said reduced portion and having an arm extending axially thereof and slidable thereon and an arm extending radially of said space, a spring acting on said last named arm and urging said carrier toward said larger portion, a flexible packing ring mounted on said carrier and contacting the arms thereof and the cylinder wall and when the free end of said axial arm abuts the larger piston portion closing communication between said passages, said ring having a normally circular cross-section of a diameter greater than the length of said axial arm and greater than the distance between the latter and the cylinder wall, said axial arm being of predetermined selected length in relation to said distance to cause the axial distortion of said ring when in passage closing position to have a predetermined fixed relationship to the radial distortion thereof.

EUGENE L. BEECHER.